(12) United States Patent
Lewis

(10) Patent No.: US 7,466,239 B2
(45) Date of Patent: Dec. 16, 2008

(54) VOICE BULB

(75) Inventor: Brian Lee Lewis, El Monte, CA (US)

(73) Assignee: Peter R Straub, Anaheim Hills, CA (US)

( * ) Notice: Subject to any disclaimer, the term of this patent is extended or adjusted under 35 U.S.C. 154(b) by 651 days.

(21) Appl. No.: 11/056,289

(22) Filed: Feb. 10, 2005

(65) Prior Publication Data

US 2006/0178888 A1 Aug. 10, 2006

(51) Int. Cl.
*H04B 1/20* (2006.01)
(52) U.S. Cl. .............................. 340/825.25; 340/693.11; 340/568.8; 340/286.11
(58) Field of Classification Search ............ 340/825.25, 340/825.22, 825.24, 691.8, 692, 691.2, 693.11, 340/515, 555, 568.8, 693.5, 286.11
See application file for complete search history.

(56) References Cited

U.S. PATENT DOCUMENTS

| | | | | |
|---|---|---|---|---|
| 3,973,193 A * | 8/1976 | Hayes | ........................ | 324/507 |
| 4,365,237 A * | 12/1982 | Knight | ........................ | 340/521 |
| 4,630,248 A * | 12/1986 | Scott | ........................... | 367/197 |
| 4,734,074 A * | 3/1988 | Kinberg et al. | ............... | 446/184 |
| 5,289,355 A * | 2/1994 | Cimock | ........................ | 362/86 |
| 5,471,373 A * | 11/1995 | Coleman et al. | ............. | 362/109 |
| 6,696,971 B2 * | 2/2004 | Tukin | ....................... | 340/693.5 |
| 6,802,755 B2 * | 10/2004 | Walker et al. | ................ | 446/175 |
| 7,109,870 B1 * | 9/2006 | Reed et al. | ................ | 340/573.2 |

* cited by examiner

*Primary Examiner*—Daniel Previl
(74) *Attorney, Agent, or Firm*—Raymond Y. Chan; David and Raymond Patent Firm

(57) ABSTRACT

A voice bulb, which is adapted for detachably mounting to an electric bulb socket, includes a supporting housing, an illumination unit, and an audio unit. The supporting housing includes a supporting base and an electric head extended therefrom for detachably connecting to the bulb socket. The illumination unit is extended from the supporting base for providing an illumination effect. The audio unit includes an audio outlet provided on the supporting base, and an audio circuit disposed in the supporting base to electrically connect to the electric head, wherein the audio circuit is selectively activated to produce a sound effect through the audio outlet to coordinate with the illumination unit so as to provide an audio-visual effect of the voice bulb.

16 Claims, 5 Drawing Sheets

VOICE BULB

BACKGROUND OF THE PRESENT INVENTION

1. Field of Invention

The present invention relates to an illumination device, and more particularly to a self-contained voice bulb which is capable of producing a wide variety of predetermined audio-visual effects.

2. Description of Related Arts

A conventional lighting device usually comprises a supporting base, having a receiving cavity and electrically connecting with a power source, and an illumination unit, such as a light bulb, disposed in the receiving cavity for being lit up to provide illumination. As a matter of conventional practice, the supporting base is usually pre-installed on the roof of a premise so that the relevant occupiers is able to conveniently attach a light bulb to the supporting base or to replace a new light bulb with a defective light bulb which has already been attached to the supporting base.

In recent years however, people have been thinking of more extensive entertainment effect at home and one important general factor to accomplish extended entertainment is the availability of appropriate audio and visual effects in the premises where the entertainment activities take place. In order to produce suitable audio and visual effects, a common practice is to turn on a hi-fi system or CD player for producing a predetermined audio effect. With respect to visual effect, one may buy rope lights or even disco lights for producing special light effects within the area in which the entertainment activities take place.

For many people, these practices may be regarded as normal, yet the reality is that people are tolerating the inconvenience of buying extra lights and installing extra audio equipments. More importantly, not every entertainment activity requires such a large scale preparations. For example, when a family is celebrating the birthday of one family member and special visual and audio effects are only needed at the moment when all of the family members are singing a birthday song, it is rather troublesome for turning on the hi-fi system or special lights for only two to three minutes. It is quite observable that the time for turning on and setting up the, say, hi-fi systems and the disco light, may even be much more than the duration of the birthday song.

Moreover, the family members need to separately control the audio equipments and the lighting equipments so that it may come to a rather interesting scenario that two or more family members are busy in operating the equipments rather than enjoying the particular entertainment or celebrating activity.

One should also aware that for small scale entertainment or celebrating activities, it is simply uneconomical and indeed unnecessary to set up a number of audio and visual equipments. However, conventional arts in this area do not provide promising assistance to cater for such situations.

SUMMARY OF THE PRESENT INVENTION

A main object of the present invention is to provide a voice bulb which is a self-contained unit capable of producing a wide variety of predetermined audio-visual effects.

Another object of the present invention is to provide a voice bulb comprising an illumination unit and an audio unit which are effectively controlled in a coordinated manner to provide predetermined audio-visual effects for entertainment or celebrating activities.

Another object of the present invention is to provide a voice bulb which is compatible with conventional electric bulb sockets so that the present invention may be utilized in all domestic or business premises which have equipped with such conventional electric bulb sockets. In other words, the voice bulb of the present invention is adapted for widespread applications in a wide variety of environments.

Another object of the present invention is to provide a voice bulb which is convenient to install and easy to operate, and does not involve complicated mechanical and electrical components so as to reduce the manufacturing cost as well as the ultimate selling price of the present invention.

Another object of the present invention is to provide a voice bulb arrangement for an illumination unit, such as a light bulb, wherein the supporting housing comprises an audio unit to be controlled for coordinating with an illuminating effect of the illumination unit so as to produce a predetermined audio-visual effect for the purpose of entertainment or celebrating activities.

Accordingly, in order to accomplish the above objects, the present invention provides a voice bulb for detachably mounting to an electric bulb socket, comprising:

a supporting housing comprising a supporting base and an electric head extended therefrom for detachably connecting to the bulb socket;

an illumination unit which is extended from the supporting base and is electrically connected to the electric head for providing an illumination effect; and an audio unit comprising an audio outlet provided on the supporting base and an audio circuit disposed in the supporting base to electrically connect to the electric head, wherein the audio circuit is selectively activated to produce a sound effect through the audio outlet to coordinate with the illumination unit so as to provide an audio-visual effect of the voice bulb.

These and other objectives, features, and advantages of the present invention will become apparent from the following detailed description, the accompanying drawings, and the appended claims.

DETAILED DESCRIPTION OF THE PREFERRED EMBODIMENT

Figure 1:
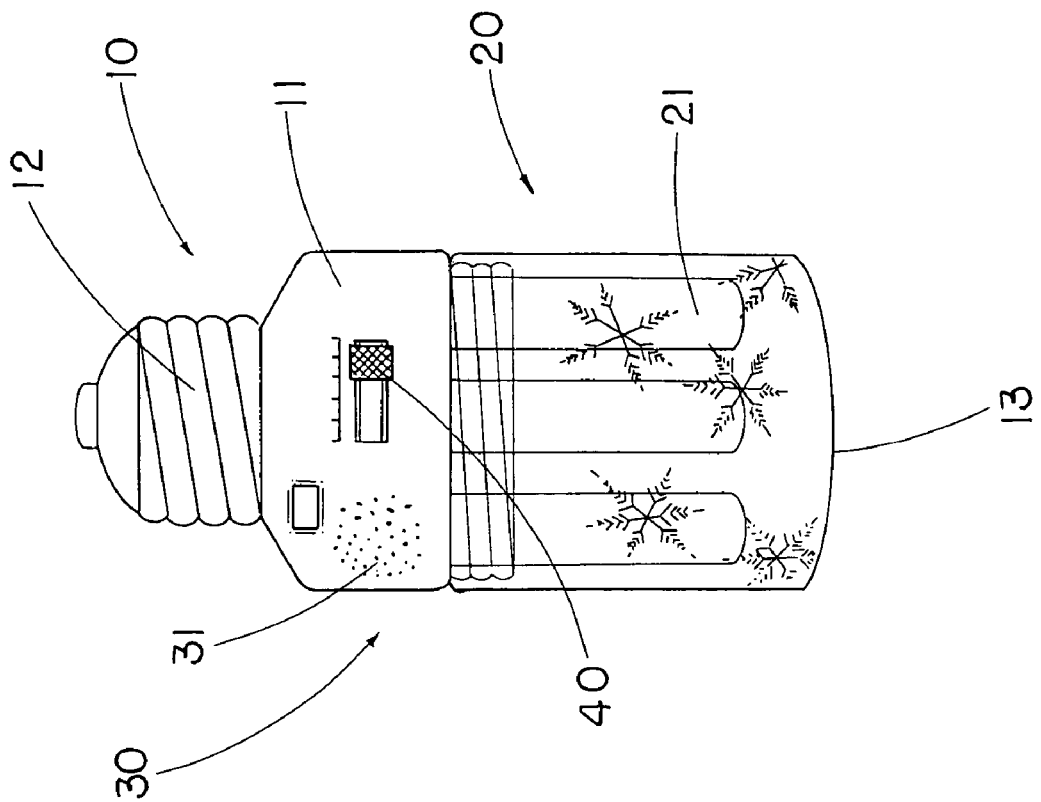
FIG. 1 is a side view of a voice bulb according to a preferred embodiment of the present invention.
Figure 1:
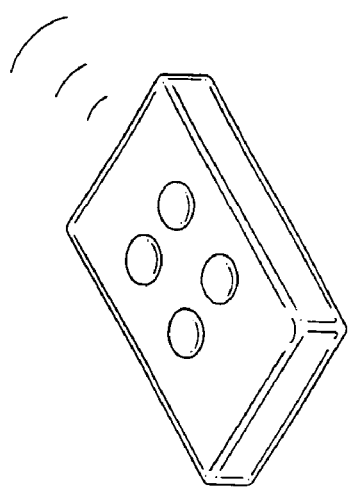
Figure 2:
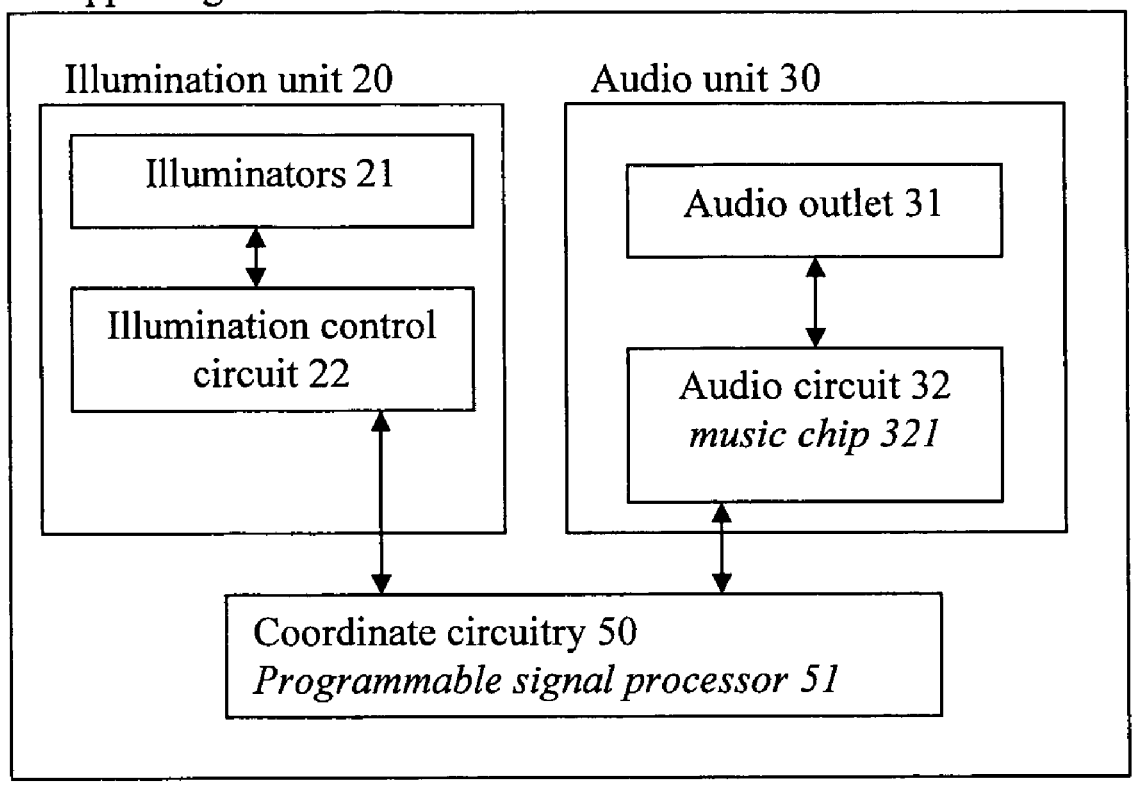
FIG. 2 is a schematic diagram of the voice bulb according to the above preferred embodiment of the present invention.

Referring to FIGS. 1 to 2 of the drawings, a voice bulb according to a preferred embodiment of the present invention is illustrated. The voice bulb, which is adapted for mounting on an electric bulb socket, comprises a supporting housing 10, an illumination unit 20, and an audio unit 30.

The supporting housing 10 comprises a supporting base 11 and an electric head 12 extended therefrom for detachably connecting to the electric bulb socket.

The illumination unit 20 is extended from the supporting base 11 and is electrically connected to the electric head 12 for providing a predetermined illumination effect.

The audio unit 30 comprises an audio outlet 31 provided on the supporting base 11, and an audio circuit 32, which comprises at least one music chip 321, being pre-programmed to store the sound signal, disposed in the supporting base 11 to electrically connect to the electric head 12, wherein the audio circuit 32 is selectively activated to produce a sound effect in accordance with the pre-programmed sound signal through the audio outlet 31 to coordinate with the illumination unit 20 so as to provide an audio-visual effect of the voice bulb.

Referring to FIG. 1 to FIG. 2 of the drawings, the supporting base 11 of the supporting housing 10 is preferably embodied as tubular in shape having a receiving cavity formed therein for receiving the illumination unit 20. Moreover, the supporting housing 10 further comprises a light admissible cover 13 detachably mounted on top of the supporting base 11 to enclose the receiving cavity thereof, wherein the illumination unit 20 is received within the receiving cavity under the curtain of the light admissible cover 13.

The illumination unit 20 comprises at least one illuminator 21 which is adapted to produce light at a predetermined intensity and color so as to create the illumination effect. In order to produce a particular illumination effect in a controlled manner, such as periodic flashing of the illuminators 21, the illumination unit 20 further comprises an illumination control circuit 22 provided in the supporting housing 10 and electrically connecting between the illuminator 21 with the electric head 12 of the supporting housing 10 for controlling the illumination effect of the illuminator 21. For example, by controlling an on/off sequence of the illuminator 21, it is adapted to be activated to create a flashing illumination effect.

The illuminator 21 is preferably embodied as a LED adapted to produce light with predetermined intensity and color. Obviously then, the illumination unit 20 can comprise a plurality of illuminators 21 which are embodied as LEDs replaceably supported by the supporting base 11 and adapted to produce light of different colors. As such, the illumination control circuit 22 is adapted to be specifically programmed to control the manner and sequence in which the plurality of LEDs is operating so as to produce a special visual illumination effect.

Figure 3:
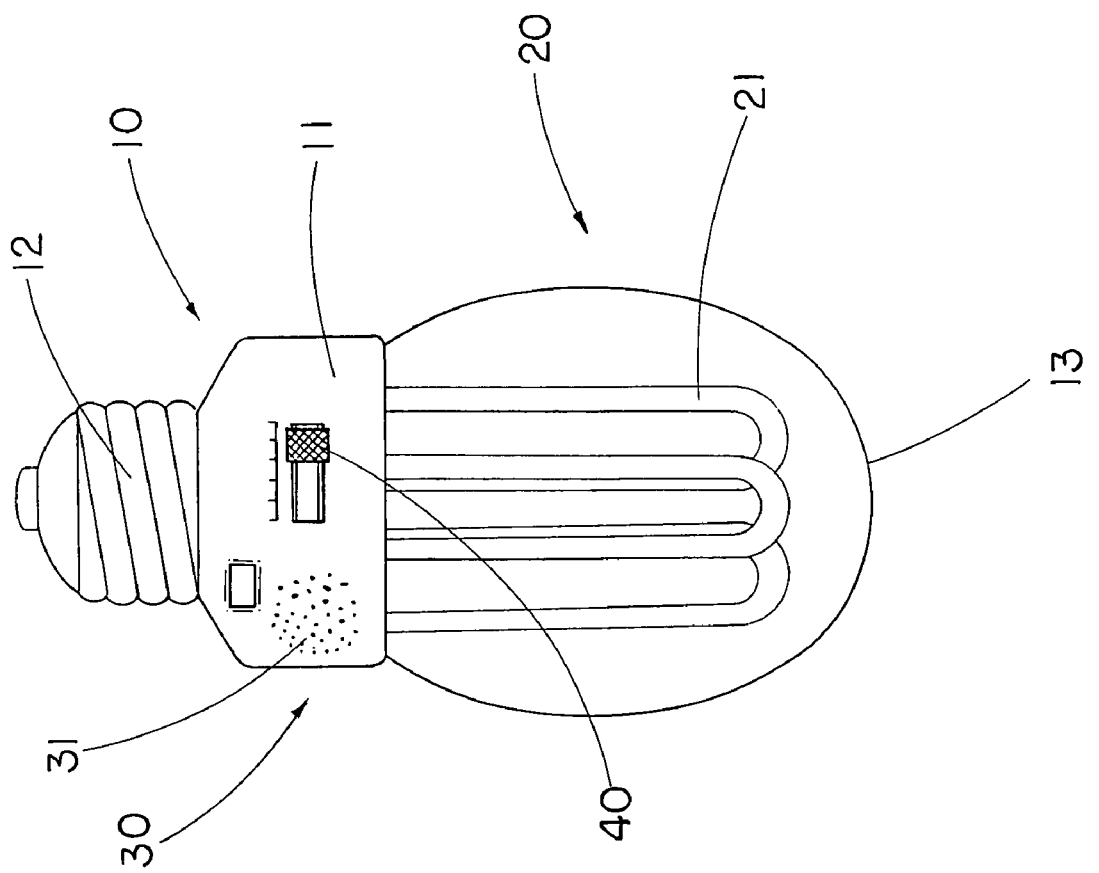
FIG. 3 is an alternative mode of the voice bulb according to the above preferred embodiment of the present invention.
Figure 3:
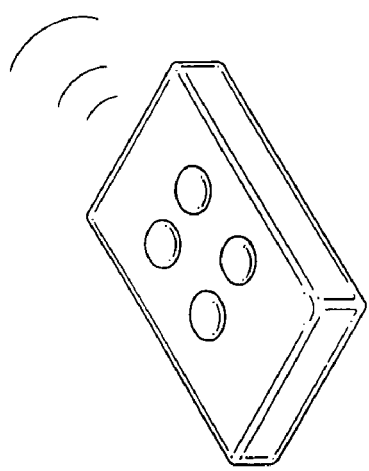

As a further alternative, as shown in FIG. 3 of the drawings, the illuminator 21 can also be embodied a regular light bulb, such as a fluorescent lamp, replaceably supported by the supporting base 11 to electrically connect with the illumination control circuit 22 for producing regular illumination at a predetermined light intensity. The key subject matter in this alternative is then of the fact that the illumination effect of the illuminator 21 is accompanied by the sound effect produced by the audio unit 30.

According to the preferred embodiment of the present invention, the audio outlet 31 comprises an audio speaker provide on a wall of the supporting housing 10 wherein the audio circuit 32, upon activation, is adapted to control the audio outlet 31 to produce a predetermined sound effect, such as playing a specific birthday song. In other words, the audio speaker of the audio outlet 31 converts the sound signal from the audio circuit 32 into an audible sound as the sound effect.

Thus, it can be appreciated that the illumination unit 20 and the audio unit 30 produce the illumination effect and the sound effect respectively to create the audio-visual effect of the voice bulb of the present invention.

Thus, the illumination control circuit 22 and the audio circuit 32 are preferably implemented in a single circuit board supported within the supporting base 11 of the supporting housing 10 for coordinately controlling the operation of the illuminators 21 and the audio outlet 31.

The voice bulb further comprises a control switch 40 provided on the supporting housing 10 and electrically connected with the illumination control circuit 22 and the audio circuit 32 to selectively activate the illumination unit 20 and the audio unit 30 when the illumination unit 20 is switched on.

Furthermore, for a more sophisticated alternative, voice bulb further comprises a coordination circuitry 50 implemented on the single circuit board wherein the coordination circuitry 50 comprises a programmable signal processor 51 which is adapted to receive a set of instructions as a program for controlling the audio circuit 32 and the illumination control circuit 22 to produce specific audio-visual effect in accordance with the set of instructions. The programmable signal processor 51 is preferably embodied as conventional programmable electronic such as a controlling chip which is pre-programmed to perform specific functions.

As a result, there are a number of combinations of operation which can be envisaged from the illumination unit 20 and the audio unit 30 to for producing the audio-visual effect:

(a) the illuminators 21 are turned on continuously while the audio unit 30 is activated to deliver a predetermined sound effect, such as playing a specific song or music; or (b) the illuminators 21 are turn on and off in a specific sequence for producing a specific illumination effect (flashing), while the audio unit 30 is activated to deliver a predetermined sound effect, such as playing a specific song or music; or (c) the illuminators 21 are controlled to produce specific illumination effect (such as color changes), while the audio unit 30 is activated to deliver predetermined sound effect, such as playing a specific song or music.

In order to further enhance the entertainment effect of the present invention, the light admissible cover 13 is shaped and crafted to have an aesthetic appeal and fixture formed thereon in such a manner to produce additional lighting effect of the light admissible cover 13. For example, as shown in FIG. 1 of the drawings, the light admissible cover 13 is crafted to have a plurality of snowflakes formed thereon so that when light is passing through the light admissible cover 13, the snowflakes will illuminate to produce special visual effect.

It is also worth mentioning that the coordination circuitry 50 may be operated by a remote control. In such a case, the voice bulb may further comprise a remote sensor mounted on the supporting housing 10 to electrically connect with the coordination circuitry 50 for receiving remote signal transmitted by a remote controller in order to operate the voice bulb in different modes.

From the forgoing descriptions, it can be seen that the above-mentioned objects have been substantially achieved. The present invention effectively provides a voice bulb comprising an illumination unit 20 and an audio unit 30 which are effectively controlled in a coordinated manner to provide predetermined audio-visual effects for entertainment or celebrating activities.

Figure 4:
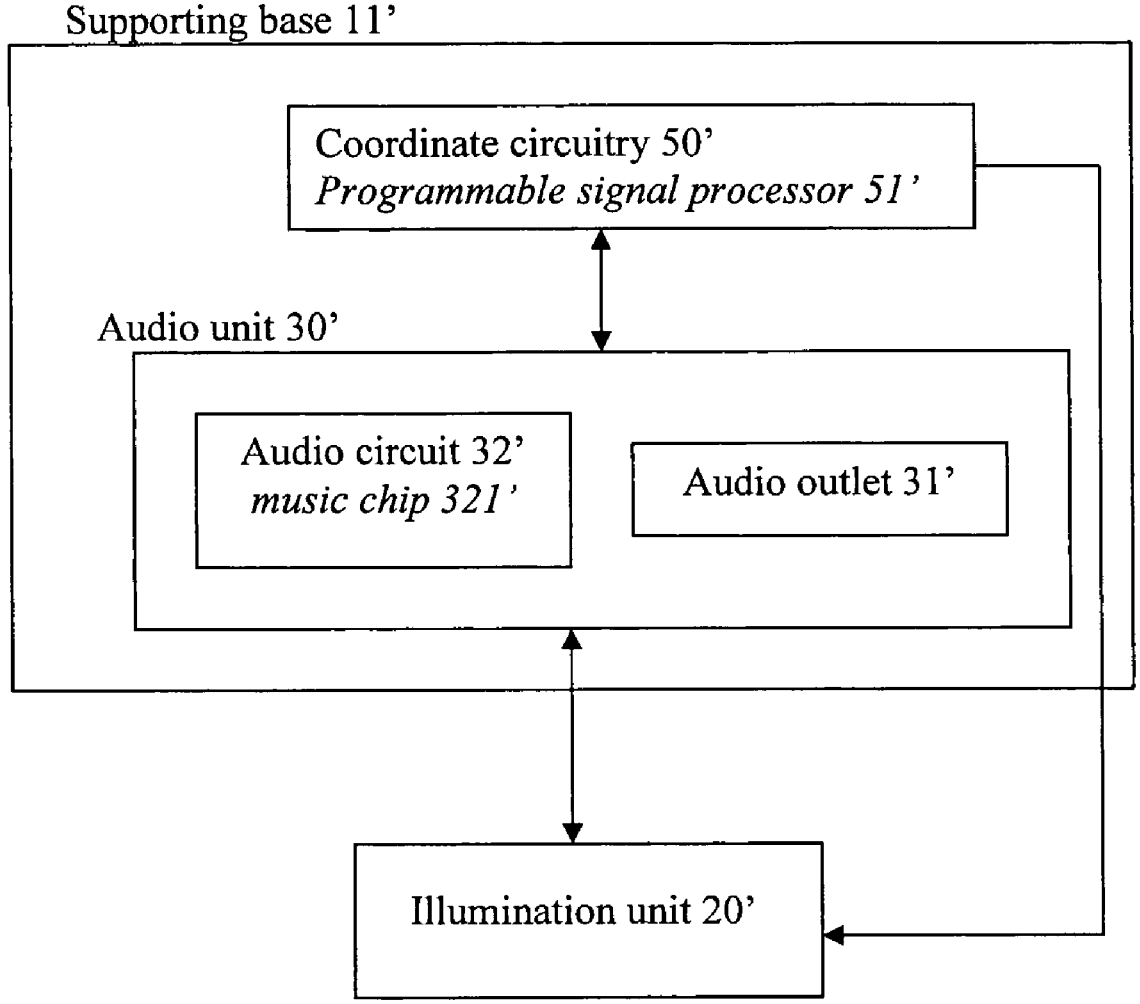
FIG. 4 is a schematic diagram of the voice bulb arrangement according to a second preferred embodiment of the present invention.
Figure 5:
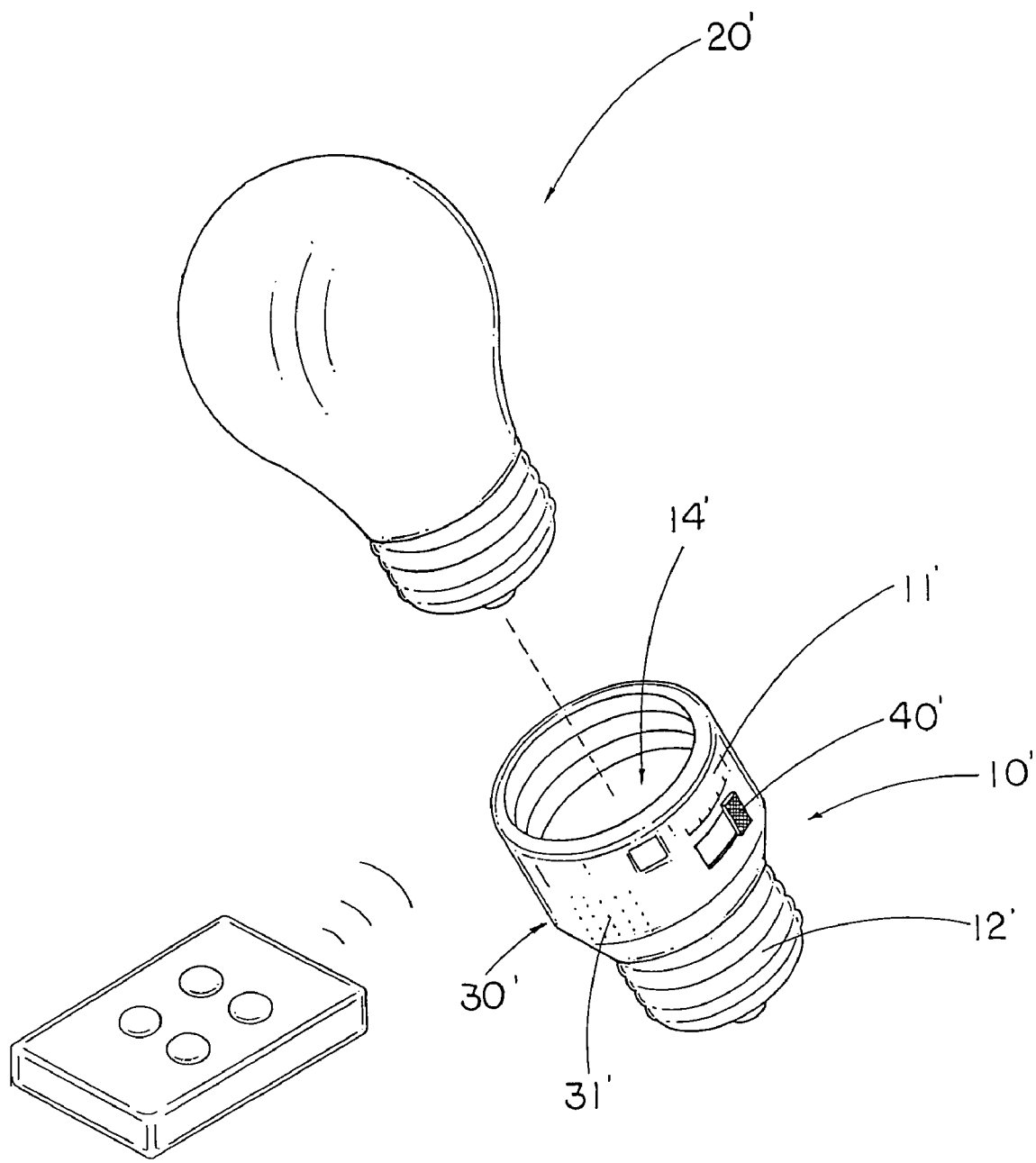
FIG. 5 is a perspective view of a voice bulb arrangement according to the above second preferred embodiment of the present invention.

Referring to FIG. 4 and FIG. 5 of the drawings, a voice bulb arrangement for an illumination unit 20' according to a second preferred embodiment of the present invention is illustrated, in which the voice bulb arrangement comprises a supporting housing 10' and an audio unit 30' provided on the supporting housing 10'.

The supporting housing 10' comprises a supporting base 11' having a receiving cavity 14' for detachably connecting to the illumination unit 20' therewithin. Moreover, the supporting housing 10' is electrically connected with an external power source such that when the illumination unit 20' is disposed in the receiving cavity 14', it is adapted to be lit up by the supporting housing 10'.

In other words, the supporting housing 10' further comprises an electric head 12' extended from the supporting base 11' for detachably connecting to the bulb socket so as to electrically connect the illumination with the bulb socket for acquiring external power source.

The audio unit 30' comprises an audio outlet 31' provided on the supporting base 11', and an audio circuit 32', which comprises at least one music chip 321', disposed in the supporting base 11', wherein the audio circuit 32' is selectively activated to produce a sound effect through the audio outlet 31' to coordinate with the illumination unit 20' so as to provide an audio-visual effect of the voice bulb.

According to the second preferred embodiment, the illumination unit 20' is embodied as a regular light bulb for producing regular illumination. Thus, the key subject matter is that the illumination effect of the illumination unit 20' is accompanied by the sound effect produced by the audio unit 30' within the framework of the voice bulb arrangement of the present invention.

According to the second preferred embodiment of the present invention, the audio outlet 31' is embodied as an audio speaker provide on the supporting housing wherein the audio circuit 32', upon activation, is adapted to control the audio outlet to produce a predetermined sound effect, such as playing a specific birthday song.

Thus, it can be appreciated that the illumination unit 20' and the audio unit 30' produce the illumination effect and the sound effect respectively to create the audio-visual effect of the voice bulb of the present invention.

The voice bulb arrangement further comprises a control switch 40' provided on the supporting housing 10' and electrically connected with the audio circuit 32' to selectively activate the illumination unit 20' and the audio unit 30'.

Furthermore, for a more sophisticated alternative, the light voice bulb arrangement further comprises a coordination circuitry 50' resided in the supporting housing 10' and comprises a programmable signal processor 51' which is adapted to receive a set of instructions as a program for controlling the audio circuit 32' and the illumination unit 20' to produce specific audio-visual effect in accordance with the set of instructions. The programmable signal processor 51' is preferably embodied as conventional programmable electronic such as a controlling chip which is pre-programmed to perform specific functions.

Moreover, the supporting housing 10' may further comprises a light admissible cover 13 (as in FIG. 1) detachably mounted on top of the supporting base 11' to enclose the receiving cavity thereof, wherein the illumination unit 20' is received within the receiving cavity under the curtain of the light admissible cover 13. In order to further enhance the entertainment effect of the present invention, the light admissible cover 13 is shaped and crafted to have an aesthetic appeal and fixture formed thereon in such a manner to produce additional lighting effect of the light admissible cover 13.

It is also worth mentioning that the coordination circuitry 50' may be operated by a remote control. In such a case, the voice bulb may further comprise a remote sensor mounted on the supporting housing 10' to electrically connect with the coordination circuitry 50' for receiving remote signal transmitted by a remote controller in order to operate the voice bulb in different modes.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A voice bulb for detachably mounting to an electric bulb socket, comprising:

a supporting housing comprising a supporting base and an electric head extended therefrom for detachably connecting to said bulb socket;

an illumination unit which is extended from said supporting base and is electrically connected to said electric head for providing an illumination effect; and an audio unit comprising an audio outlet provided on said supporting base and an audio circuit disposed in said supporting base to electrically connect to said electric head, wherein said audio circuit is selectively activated to produce a sound effect through said audio outlet to coordinate with said illumination effect so as to provide an audio-visual effect of said voice bulb, wherein said audio circuit comprises at least one music chip, being pre-programmed to store said sound signal, electrically connected with said audio outlet to operate said audio outlet to produce said sound effect in accordance with said pre-programmed sound signal, wherein said supporting housing further comprises a light admissible cover detachably mounted to said supporting base to enclose said illumination unit within said light admissible cover, wherein said light admissible cover is shaped and crafted to have an aesthetic appeal and fixture formed thereon for enhancing said illumination effect of said illumination unit, so that light generated from said illumination unit is emitted to an exterior of said voice bulb via said light admissible cover to produce said illumination effect.

2. The voice bulb, as recited in claim 1, wherein said illumination unit comprises a plurality of LEDs replaceably supported by said supporting base and an illumination control circuit provided in said supporting housing to electrically connect said LEDs with said electric head of said supporting housing so as to selectively activate said LEDs for producing illumination in a predetermined duration and color.

3. The voice bulb, as recited in claim 2, wherein said audio outlet comprises an audio speaker provide on a wall of said supporting housing to electrically connect with said audio circuit in such a manner that when said audio circuit is activated, said audio speaker converts a sound signal from said audio circuit into an audible sound as said sound effect.

4. The voice bulb, as recited in claim 3, further comprising a control switch provided on said supporting housing to electrically connect with said audio circuit so as to selectively activate said audio unit when said illumination unit is switched on.

5. The voice bulb, as recited in claim 4, further comprising a coordination circuitry comprising a programmable signal processor which is adapted to receive a set of instructions as a program for controlling said audio circuit and said illumination control circuit to produce said audio-visual effect in accordance with said set of instructions.

6. The voice bulb, as recited in claim 2, further comprising a coordination circuitry comprising a programmable signal processor which is adapted to receive a set of instructions as a program for controlling said audio circuit and said illumination control circuit to produce said audio-visual effect in accordance with said set of instructions.

7. The voice bulb, as recited in claim 1, wherein said audio outlet comprises an audio speaker provide on a wall of said supporting housing to electrically connect with said audio circuit in such a manner that when said audio circuit is activated, said audio speaker converts a sound signal from said audio circuit into an audible sound as said sound effect.

8. The voice bulb, as recited in claim 7, further comprising a control switch provided on said supporting housing to electrically connect with said audio circuit so as to selectively activate said audio unit when said illumination unit is switched on.

9. The voice bulb, as recited in claim 8, further comprising a coordination circuitry comprising a programmable signal processor which is adapted to receive a set of instructions as a program for controlling said audio circuit and said illumination control circuit to produce said audio-visual effect in accordance with said set of instructions.

10. The voice bulb, as recited in claim 1, wherein said illumination unit comprises a light bulb replaceably supported by said supporting base and an illumination control circuit provided in said supporting housing to electrically connect said light bulb with said electric head of said supporting housing so as to selectively activate said light bulb for producing light at a predetermined intensity.

11. The voice bulb, as recited in claim 10, further comprising a control switch provided on said supporting housing to electrically connect with said audio circuit so as to selectively activate said audio unit when said illumination unit is switched on.

12. The voice bulb, as recited in claim 11, further comprising a coordination circuitry comprising a programmable signal processor which is adapted to receive a set of instructions as a program for controlling said audio circuit and said illumination control circuit to produce said audio-visual effect in accordance with said set of instructions.

13. A voice bulb arrangement for detachably mounting an illumination unit to an electric bulb socket, comprising:

a supporting housing which comprises a supporting base for said illumination unit replaceably mounting thereto and an electric head extended from said supporting base for detachably connecting to said bulb socket so as to electrically connect said illumination with said bulb socket; and an audio unit comprising an audio outlet provided on said supporting base and an audio circuit disposed in said supporting base to electrically connect to said supporting base, wherein said audio circuit is selectively activated to produce a sound effect through said audio outlet to coordinate with an illumination effect of said illumination unit so as to provide an audio-visual effect, wherein said audio circuit comprises at least one music chip, being pre-programmed to store said sound signal, electrically connected with said audio outlet to operate said audio outlet to produce said sound effect in accordance with said pre-programmed sound signal, wherein said supporting housing further comprises a light admissible cover detachably mounted to said supporting base for enclosing said illumination unit within said light admissible cover, wherein said light admissible cover is shaped and crafted to have an aesthetic appeal and fixture formed thereon for enhancing said illumination effect of said illumination unit, so that light generated from said illumination unit is emitted to an exterior of said voice bulb via said light admissible cover to produce said illumination effect.

14. The voice bulb arrangement, as recited in claim 13, wherein said audio outlet comprises an audio speaker provide on a wall of said supporting housing to electrically connect with said audio circuit in such a manner that when said audio circuit is activated, said audio speaker converts a sound signal from said audio circuit into an audible sound as said sound effect.

15. The voice bulb arrangement, as recited in claim 14, further comprising a control switch provided on said supporting housing to electrically connect with said audio circuit so as to selectively activate said audio unit when said illumination unit is switched on.

16. The voice bulb arrangement, as recited in claim 15, further comprising a coordination circuitry comprising a programmable signal processor which is adapted to receive a set of instructions as a program for controlling said audio circuit and said illumination unit to produce said audio-visual effect in accordance with said set of instructions.

* * * * *